(12) United States Patent
Inagaki et al.

(10) Patent No.: US 8,541,137 B2
(45) Date of Patent: *Sep. 24, 2013

(54) NONAQUEOUS ELECTROLYTE BATTERY CONTAINING A NEGATIVE ELECTRODE OF LITHIUM-TITANIUM COMPOSITE OXIDE, BATTERY PACK AND VEHICLE

(71) Applicants: Hiroki Inagaki, Kawasaki (JP); Norio Takami, Yokohama (JP)

(72) Inventors: Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,382

(22) Filed: Oct. 24, 2012

(65) Prior Publication Data

US 2013/0052488 A1    Feb. 28, 2013

Related U.S. Application Data

(63) Continuation of application No. 13/181,211, filed on Jul. 12, 2011, now Pat. No. 8,318,351, which is a continuation of application No. 12/512,540, filed on Jul. 30, 2009, now abandoned, which is a continuation of application No. 11/228,430, filed on Sep. 19, 2005, now Pat. No. 7,595,134.

(30) Foreign Application Priority Data

May 13, 2005   (JP) ................................ 2005-141146

(51) Int. Cl.
 *H01M 4/131*      (2010.01)
 *H01M 4/485*      (2010.01)
(52) U.S. Cl.
 USPC .................................... 429/231.1; 429/231.5

(58) Field of Classification Search
 USPC ............................. 429/231.1, 231.5, 231.95
 See application file for complete search history.

(56) References Cited

U.S. PATENT DOCUMENTS 6,514,640 B1 *   2/2003   Armand et al. ............ 429/231.1
7,303,840 B2 *  12/2007   Thackeray et al. ...... 429/231.95

(Continued)

FOREIGN PATENT DOCUMENTS

CN   1571194 A    1/2005
CN   1601800 A    3/2005

(Continued)

OTHER PUBLICATIONS

Office Action issued Feb. 22, 2011, in Japan Patent Application No. 2008-287906 (with English translation).

(Continued)

*Primary Examiner* — Stephen J. Kalafut
(74) *Attorney, Agent, or Firm* — Oblon, Spivak, McClelland, Maier & Neustadt, L.L.P.

(57) ABSTRACT

A nonaqueous electrolyte battery, containing a case and provided in the case, a positive electrode containing at least one selected from the group consisting of spinel type lithium-manganese-nickel composite oxide and lithium phosphate oxide having an olivine structure, a negative electrode and a nonaqueous electrolyte. The negative electrode comprises a lithium-titanium composite oxide, wherein a crystallite diameter of the lithium-titanium composite oxide is not larger than $6.9 \times 10^2$ Å. The lithium-titanium composite oxide comprises: rutile $TiO_2$; anatase $TiO_2$; $Li_2TiO_3$; and a lithium titanate having a spinel structure. A main peak intensity relative to lithium titanate set at 100, as determined by X-ray diffractometry, of each of lithium titanate having a spinel structure, the rutile $TiO_2$, the anatase $TiO_2$ and $Li_2TiO_3$ is not larger than 7.

17 Claims, 5 Drawing Sheets

(56) References Cited

U.S. PATENT DOCUMENTS

| | | |
|---|---|---|
| 7,462,425 B2 | 12/2008 | Takami et al. |
| 7,482,090 B2 | 1/2009 | Tatebayashi et al. |
| 7,582,386 B2 | 9/2009 | Takami et al. |
| 7,595,134 B2 | 9/2009 | Inagaki et al. |
| 7,601,463 B2 | 10/2009 | Inagaki et al. |
| 7,629,081 B2 | 12/2009 | Inagaki et al. |
| 7,662,515 B2 | 2/2010 | Inagaki et al. |
| 7,803,483 B2 | 9/2010 | Takami et al. |
| 7,811,703 B2 | 10/2010 | Fujita et al. |
| 7,833,664 B2 | 11/2010 | Fujita et al. |
| 7,858,234 B2 | 12/2010 | Morishima et al. |
| 7,887,955 B2 | 2/2011 | Saruwatari et al. |
| 7,892,674 B2 | 2/2011 | Takami et al. |
| 7,923,152 B2 | 4/2011 | Inagaki et al. |
| 7,927,740 B2 | 4/2011 | Inagaki et al. |
| 8,003,255 B2 | 8/2011 | Inagaki et al. |
| 8,039,151 B2 | 10/2011 | Inagaki et al. |
| 8,088,514 B2 | 1/2012 | Takami et al. |
| 8,137,843 B2 | 3/2012 | Harada et al. |
| 8,247,101 B2 | 8/2012 | Inagaki et al. |
| 2005/0064282 A1 | 3/2005 | Inagaki et al. |
| 2006/0068272 A1 | 3/2006 | Takami et al. |
| 2006/0134520 A1 | 6/2006 | Ishii et al. |
| 2007/0072080 A1 | 3/2007 | Inagaki et al. |
| 2007/0281214 A1 | 12/2007 | Saruwatari et al. |
| 2008/0176142 A1 | 7/2008 | Inagaki et al. |
| 2009/0202892 A1 | 8/2009 | Inagaki et al. |
| 2009/0291354 A1 | 11/2009 | Inagaki et al. |
| 2011/0268998 A1 | 11/2011 | Inagaki et al. |

FOREIGN PATENT DOCUMENTS

| | | |
|---|---|---|
| JP | 2000-156229 | 6/2000 |
| JP | 2001-240498 | 9/2001 |
| JP | 2001-351628 | 12/2001 |
| JP | 2002-8658 | 1/2002 |
| JP | 2003-323893 | 11/2003 |
| JP | 2004-235144 | 8/2004 |
| JP | 2005-56672 | 3/2005 |
| KR | 10-2005-0000552 | 1/2005 |
| KR | 10-2005-0030566 | 3/2005 |
| WO | 03/008334 | 1/2003 |

OTHER PUBLICATIONS

Sigma-Aldrich Lithium titanate, spinel web page (no date).

* cited by examiner

NONAQUEOUS ELECTROLYTE BATTERY CONTAINING A NEGATIVE ELECTRODE OF LITHIUM-TITANIUM COMPOSITE OXIDE, BATTERY PACK AND VEHICLE

CROSS-REFERENCE TO RELATED APPLICATIONS

This application is a continuation application of U.S. patent application Ser. No. 13/181,211, filed Jul. 12, 2011, the disclosure of which is incorporated herein by reference in its entirety. The parent application is a continuation application of U.S. patent application Ser. No. 12/512,540, filed Jul. 30, 2009, now abandoned, the disclosure of which is incorporated herein by reference in its entirety. U.S. patent application Ser. No. 12/512,540 is a continuation application of U.S. patent application Ser. No. 11/228,430, filed Sep. 19, 2005, now U.S. Pat. No. 7,595,134, issued Sep. 29, 2009, the disclosure of which is incorporated herein by reference in its entirety. The parent applications claim priority to Japanese Patent Application No. 2005-141146, filed May 13, 2005, the disclosure of which is incorporated herein by reference in its entirety.

BACKGROUND OF THE INVENTION

1. Field of the Invention

The present invention relates to a nonaqueous electrolyte battery, a lithium-titanium composite oxide, a battery pack and a vehicle.

2. Description of the Related Art

A vigorous research is being conducted on a nonaqueous electrolyte battery having a high energy density in which lithium ions are migrated between the negative electrode and the positive electrode for charging and discharging the battery.

Various properties are required for the nonaqueous electrolyte battery depending on the use of the battery. For example, the discharge under a current of about 3 C is expected when the nonaqueous electrolyte battery is used in a digital camera, and the discharge under a current of at least about 10 C is expected when the nonaqueous electrolyte battery is used in a vehicle such as a hybrid electric automobile. Such being the situation, the large current characteristics are particularly required in the nonaqueous electrolyte battery used in the technical fields exemplified above.

Nowadays, a nonaqueous electrolyte battery in which a lithium-transition metal composite oxide is used as a positive electrode active material and a carbonaceous material is used as a negative electrode active material has been put to the practical use. In general, Co, Mn or Ni is used as the transition metal included in the lithium-transition metal composite oxide.

In recent years, a nonaqueous electrolyte battery in which a lithium-titanium composite oxide having a high Li absorption-release potential relative to the carbonaceous material has been put to the practical use. Since the lithium-titanium composite oxide is small in the change of volume accompanying the charge-discharge of the battery, the lithium-titanium composite oxide is expected to improve the charge-discharge cycle characteristics of the secondary battery.

Among the lithium-titanium composite oxides, the Spinel type lithium titanate is expected to be particularly useful. The Spinel type lithium titanate can be synthesized by, for example, mixing lithium hydroxide with titanium dioxide, followed by baking the resultant mixture. If the baking is insufficient in this synthesizing process, obtained are lithium-titanium composite oxides containing an anatase type $TiO_2$, a rutile type $TiO_2$, and $Li_2TiO_3$ as impurity phases in addition to the Spinel type lithium titanate.

It is disclosed in Japanese Patent Disclosure (Kokai) No. 2001-240498 that lithium-titanium composite oxides containing the Spinel type lithium titanate as a main component, having a small amount of the impurity phases noted above, and also having a crystallite diameter of 700 to 800 Å can be used as the negative electrode active material having a large capacity.

BRIEF SUMMARY OF THE INVENTION

An object of the present invention is to provide a nonaqueous electrolyte battery, a lithium-titanium composite oxide, a battery pack and a vehicle, which are excellent in the large current characteristics.

According to a first aspect of the present invention, there is provided a nonaqueous electrolyte battery, comprising:
a case;
a positive electrode provided in the case;
a negative electrode provided in the case and containing a lithium-titanium composite oxide comprising a crystallite diameter not larger than $6.9 \times 10^2$ Å, the lithium-titanium composite oxide a rutile type $TiO_2$, an anatase type $TiO_2$, $Li_2TiO_3$ and a lithium titanate having a spinel structure, the rutile type $TiO_2$, the anatase type $TiO_2$ and $Li_2TiO_3$ each having a main peak intensity not larger than 7 on the basis that a main peak intensity of the lithium titanate as determined by the X-ray diffractometry is set at 100; and
a nonaqueous electrolyte provided in the case.

According to a second aspect of the present invention, there is provided a battery pack comprising nonaqueous electrolyte batteries,
each of the nonaqueous electrolyte batteries comprising:
a case;
a positive electrode provided in the case;
a negative electrode provided in the case and containing a lithium-titanium composite oxide comprising a crystallite diameter not larger than $6.9 \times 10^2$ Å, the lithium-titanium composite oxide including a rutile type $TiO_2$, an anatase type $TiO_2$, $Li_2TiO_3$ and a lithium titanate having a spinel structure, the rutile type $TiO_2$, the anatase type $TiO_2$ and $Li_2TiO_3$ each having a main peak intensity not larger than 7 on the basis that a main peak intensity of the lithium titanate as determined by the X-ray diffractometry is set at 100; and
a nonaqueous electrolyte provided in the case.

Further, according to a third aspect of the present invention, there is provided a lithium-titanium composite oxide comprising a crystallite diameter not larger than $6.9 \times 10^2$ Å, the lithium-titanium composite oxide including a rutile type $TiO_2$, an anatase type $TiO_2$, $Li_2TiO_3$ and a lithium titanate having a spinel structure, the rutile type $TiO_2$, the anatase type $TiO_2$ and $Li_2TiO_3$ each having a main peak intensity not larger than 7 on the basis that a main peak intensity of the lithium titanate as determined by the X-ray diffractometry is set at 100.

According to a fourth aspect of the present invention, there is provided a vehicle comprising a battery pack comprising nonaqueous electrolyte batteries,
each of the nonaqueous electrolyte batteries comprising:
a case;
a positive electrode provided in the case;
a negative electrode provided in the case and containing a lithium-titanium composite oxide comprising a crystallite diameter not larger than $6.9 \times 10^2$ Å, the lithium-titanium composite oxide including a rutile type $TiO_2$, an anatase type TiO$_2$, Li$_2$TiO$_3$ and a lithium titanate having a spinel structure, the rutile type TiO$_2$, the anatase type TiO$_2$ and Li$_2$TiO$_3$ each having a main peak intensity not larger than 7 on the basis that a main peak intensity of the lithium titanate as determined by the X-ray diffractometry is set at 100; and a nonaqueous electrolyte provided in the case.

DETAILED DESCRIPTION OF THE INVENTION

Figure 1A:
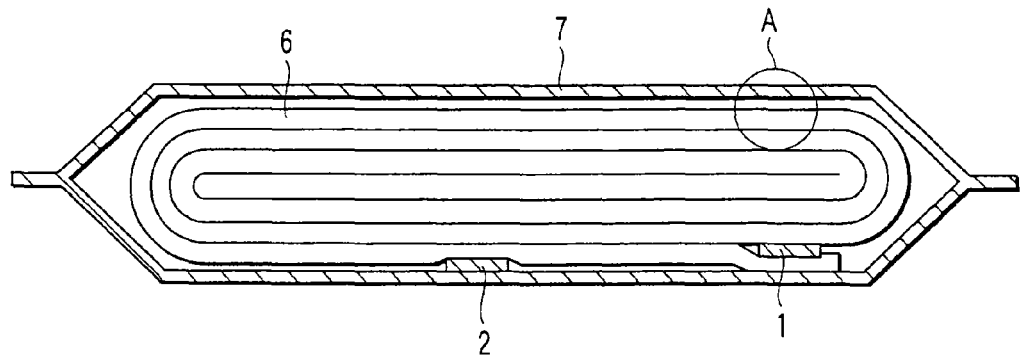
FIG. 1A is a cross sectional view schematically showing as an example the construction of a unit cell according to a first embodiment of the present invention.

As a result of an extensive research, the present inventors have found that the lithium-titanium composite oxide exhibits a relatively low lithium ion conductivity. For example, it has been found that the lithium ion conductivity of the lithium-titanium composite oxide is much lower than that of lithium-cobalt composite oxide. To be more specific, the lithium ion conductivity of the lithium-titanium composite oxide is one-several hundredth of that of lithium-cobalt composite oxide. As a result, in the nonaqueous electrolyte battery comprising both lithium-titanium composite oxide and lithium-cobalt composite oxide, the diffusion of the lithium ions in the lithium-titanium composite oxide provides the rate-determining step and thus, the nonaqueous electrolyte battery is made poor in its large current characteristics.

Under the circumstances, the present inventors have found that the diffusion rate of the lithium ions is increased with decrease in the crystallite diameter of the lithium-titanium composite oxide so as to improve the ionic conductivity of the lithium-titanium composite oxide.

The present inventors have also found that the diffusion rate of lithium ions is increased with decrease in the amount of the impurity phases contained in the lithium-titanium composite oxide. It is considered reasonable to understand that the impurity phases impair the diffusion of lithium ions so as to lower the diffusion rate of the lithium ions.

However, where the baking is performed sufficiently in the manufacturing process, the lithium-titanium composite oxide has a large crystallite diameter and the amount of the impurity phases is decreased in the manufactured lithium-titanium composite oxide. On the other hand, where the baking is suppressed in the manufacturing process, the lithium-titanium composite oxide has a small crystallite diameter and contains a large amount of the impurity phases. Such being the situation, it was difficult to manufacture a lithium-titanium composite oxide having a small crystallite diameter and containing a small amount of the impurity phases so as to make it difficult to improve the ionic conductivity of the lithium-titanium composite oxide.

The present inventors have found that the ionic conductivity of the lithium-titanium composite oxide can be improved by allowing the crystallite diameter and the amount of the impurity phases of the lithium-titanium composite oxide to satisfy the conditions described herein later, thereby improving the large current discharge characteristics of the nonaqueous electrolyte battery.

Each embodiment of the present invention will now be described with reference to the accompanying drawings. Incidentally, in the accompanying drawings, the common constituents of the embodiment are denoted by the same reference numerals so as to omit the overlapping description. Also, the accompanying drawings are schematic drawings that are simply intended to facilitate the understanding of the present invention. The accompanying drawings may include portions differing from the actual apparatus in the shape, size and ratio. However, the design of the apparatus may be changed appropriately in view of the following description and the known technologies.

First Embodiment

The construction of the unit cell as an example according to the first embodiment of the present invention will now be described with reference to FIGS. 1A and 1B. Specifically, FIG. 1A is a cross sectional view schematically showing the construction of a flattened type nonaqueous electrolyte secondary battery according to the first embodiment of the present invention, and FIG. 1B is a cross sectional view showing in detail the construction of a circular region A shown in FIG. 1A.

A positive electrode terminal 1 is electrically connected to a positive electrode 3, and a negative electrode terminal 2 is electrically connected to a negative electrode 4. The positive electrode 3, the negative electrode 4 and a separator 5 interposed between the positive electrode 3 and the negative electrode 4 collectively form a flattened wound electrode 6. Since the separator 5 is interposed between the positive electrode 3 and the negative electrode 4, the negative electrode 4 and the positive electrode 3 are positioned spatially apart from each other. The wound electrode 6 is housed in a case 7 having a nonaqueous electrolyte loaded therein.

As shown in FIG. 1A, the flattened wound electrode 6 is housed in the case 7 having the nonaqueous electrolyte loaded therein. The negative electrode 2 is electrically connected to the outside and the positive electrode terminal 1 is electrically connected to the inside in the vicinity of the outer circumferential edge of the wound electrode 6. The wound electrode 6 has a laminate structure comprising the negative electrode 4, the separator 5, the positive electrode 3 and the separator 5, which are laminated one upon the other in the order mentioned, though the laminate structure is not shown in FIG. 1A.

Figure 1B:
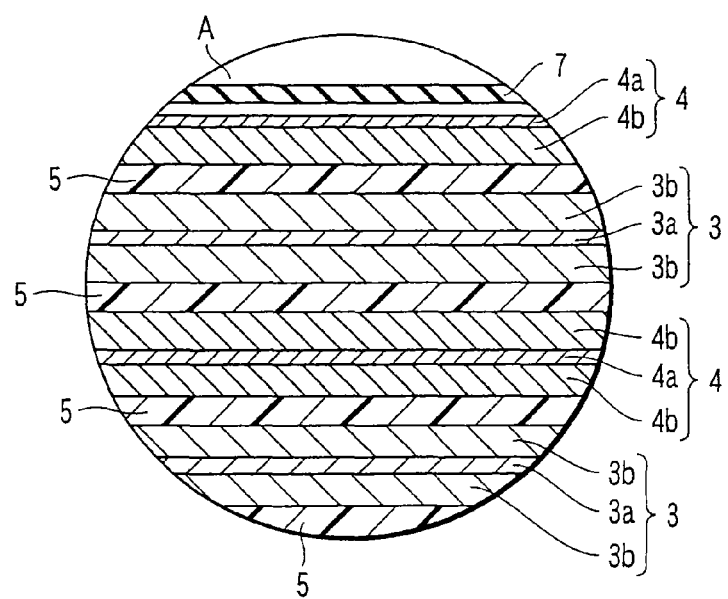
FIG. 1B is a cross sectional view schematically showing the construction of the circular portion A shown in FIG. 1A.

FIG. 1B shows more in detail the construction of the wound electrode 6. As shown in the drawing, the positive electrode 3, the negative electrode 4 and the separator 5 interposed between the positive electrode 3 and the negative electrode 4 are laminated one upon the other in the order mentioned. The negative electrode 4 constituting the outermost circumferential region comprises a negative electrode current collector 4a forming the outer layer and a negative electrode layer 4b positioned inside the negative electrode current collector 4a. Each of the other negative electrodes 4 comprises the negative electrode layer 4b, the negative electrode current collector 4a and the additional negative electrode layer 4b, which are laminated one upon the other in the order mentioned. Likewise, the positive electrode 3 comprises a positive electrode layer 3b, a positive electrode current collector 3a and another positive electrode layer 3b, which are laminated one upon the other in the order mentioned.

The negative electrode, the nonaqueous electrolyte, the positive electrode, the separator, the case, the positive electrode terminal, and the negative electrode terminal included in the nonaqueous electrolyte battery will now be described in detail.

1) Negative Electrode

The negative electrode comprises a negative electrode current collector and a negative electrode layer supported on one surface or both surfaces of the negative electrode current collector and containing a negative electrode active material, a negative electrode conductive agent, and a binder.

The negative electrode active material comprises a lithium-titanium composite oxide having the crystallite diameter not larger than $6.9 \times 10^2$ Å and containing a lithium titanate having a spinel structure (hereinafter referred to a Spinel type lithium titanate) as the main component and low in the impurity phase content. The Spinel type lithium titanate can be represented by the chemical formula $Li_{4+x}Ti_5O_{12}$ ($0 \leq x \leq 3$).

To be more specific, the crystallite diameter of the lithium-titanium composite oxide, which is obtained by the Scherrer formula from the half value width of the X-ray diffraction peak, is not larger than $6.9 \times 10^2$ Å. Also, the lithium-titanium composite oxide contains a rutile type $TiO_2$, an anatase type $TiO_2$ and $Li_2TiO_3$ each having the main peak intensity not larger than 7 on the basis that the main peak intensity of the Spinel type lithium titanate as determined by the X-ray diffractometry is set at 100. Incidentally, the situation that the main peak intensity of any of the rutile type $TiO_2$, the anatase type $TiO_2$ and $Li_2TiO_3$ is not larger than 7 covers the case where the main peak intensity is zero (0) in some of the main peak intensity of the rutile type $TiO_2$, the main peak intensity of the anatase type $TiO_2$ and the main peak intensity of $Li_2TiO_3$, and the case where the main peak intensity is zero in all of the rutile type $TiO_2$, the anatase type $TiO_2$ and $Li_2TiO_3$. Where the main peak intensity is lower than the detection limit, the main peak intensity is regarded as being zero (0).

The main peak of the Spinel type lithium titanate denotes the peak in the case where the lattice spacing d in the X-ray diffraction pattern is 4.83 Å. Also, the main peak of the anatase type $TiO_2$, the main peak of the rutile type $TiO_2$ and the main peak of $Li_2TiO_3$ denote the peaks in the cases where the lattice spacing d is 3.51 Å, 3.25 Å and 2.07 Å, respectively.

The lithium-titanium composite oxide in this embodiment of the present invention makes it possible to increase the diffusion rate of the lithium ions and to improve the ionic conductivity. In addition, it is possible to improve the large current characteristics of the nonaqueous electrolyte battery. Incidentally, the diffusion rate noted above includes both the transgranular diffusion and the grain boundary diffusion. It is considered reasonable to understand that the effect produced by the lithium-titanium composite oxide according to this embodiment of the present invention is produced by the situation that the lithium ion diffusion rate at the crystal grain boundary is higher than that inside the crystal grain.

It is desirable for the crystallite diameter of the lithium-titanium composite oxide to be not larger than $5.3 \times 10^2$ Å. If the crystallite diameter is not larger than $5.3 \times 10^2$ Å, the ionic conductivity and the large current characteristics can be further improved. It is more desirable for the crystallite diameter to be not larger than $4.4 \times 10^2$ Å.

It is desirable for the crystallite diameter of the lithium-titanium composite oxide to be not smaller than $1.5 \times 10^2$ Å. If the crystallite diameter is not smaller than $1.5 \times 10^2$ Å, it is possible to form easily the lithium-titanium composite oxide low in the contents of the impurity phases such as the rutile type $TiO_2$, the anatase type $TiO_2$ and $Li_2TiO_3$. It is more desirable for the crystallite diameter to be not smaller than $2.6 \times 10^2$ Å.

It is desirable for the main peak intensity of any of the rutile type $TiO_2$, the anatase type $TiO_2$ and $Li_2TiO_3$ to be not higher than 3, more desirably not higher than 1.

The diffusion rate of the lithium ions can be further improved with decrease in the amount of the impurity phases noted above. Also, the ionic conductivity and the large current characteristics can be improved with decrease in the amount of the impurity phases noted above.

It is desirable for the lithium-titanium composite oxide to be in the form of particles having the average particle diameter not smaller than 100 nm and not larger than 1 μm. If the average particle diameter is not smaller than 100 nm, the lithium-titanium composite oxide can be handled easily in the industrial manufacture of the nonaqueous electrolyte battery. Also, if the average particle diameter is not larger than 1 μm, the diffusion of the lithium ions within a particle can be performed smoothly.

It is desirable for the lithium-titanium composite oxide to have a specific surface area not smaller than 5 $m^2$/g and not larger than 50 $m^2$/g. If the specific surface area is not smaller than 5 $m^2$/g, it is possible to secure sufficiently the absorption-release sites of the lithium ions. On the other hand, if the specific surface area is not larger than 50 $m^2$/g, the lithium-titanium composite oxide can be handled easily in the industrial manufacture of the nonaqueous electrolyte battery.

Incidentally, it is possible for the lithium-titanium composite oxide to contain Nb, Pb, Fe, Ni, Si, Al, Zr, etc. in an amount of 1,000 ppm or less.

An example of the manufacturing method of the lithium-titanium composite oxide will now be described.

In the first step, prepared is a lithium salt used as a lithium source such as lithium hydroxide, lithium oxide or lithium carbonate. Also prepared are a sodium hydroxide as the sodium source and potassium hydroxide as the potassium source. Prescribed amounts of the lithium source and at least one of the sodium source and potassium source are dissolved in a pure water so as to obtain an aqueous solution. Desired addition amounts of the sodium source and the potassium source will be described herein later.

In the next step, titanium oxide is put in the resultant solution such that lithium and titanium have a prescribed atomic ratio. For example, in the case of synthesizing the lithium-titanium composite oxide having the spinel structure and the chemical formula of $Li_4Ti_5O_{12}$, titanium oxide is added to the solution such that Li and Ti have an atomic ratio of 4:5.

In the next step, the solution thus obtained is dried while stirring the solution so as to obtain a baking precursor. The drying method employed in this stage includes, for example, a spray drying, a granulating drying, a freeze drying, and a combination thereof. The baking precursor thus obtained is baked so as to form a lithium-titanium composite oxide for this embodiment of the present invention. It suffices to perform the baking under the air atmosphere. It is also possible to perform the baking under an oxygen gas atmosphere or an argon gas atmosphere.

It suffices to perform the baking under temperatures not lower than 680° C. and not higher than 1,000° C. for about 1 hour to about 24 hours. Preferably, the baking should be carried out under temperatures not lower than 720° C. and not higher than 800° C. for 5 hours to 10 hours.

If the baking temperature is lower than 680° C., the reaction between titanium oxide and the lithium compound is rendered insufficient so as to increase the amount of the impurity phases such as the anatase type $TiO_2$, the rutile type $TiO_2$ and $Li_2TiO_3$, with the result that the electric capacity is decreased. On the other hand, if the baking temperature exceeds 1,000° C., the sintering of the Spinel type lithium titanate proceeds so as to cause the crystallite diameter to be increased excessively and, thus, to lower the large current performance.

The lithium-titanium composite oxide manufactured by the manufacturing method described above contains Na or K. Each of Na and K performs the function of suppressing the crystal growth of the Spinel type lithium titanate. Such being the situation, it is possible to suppress the growth of the crystallite of the Spinel type lithium titanate even if the baking is performed under high temperatures in an attempt to prevent the phases such as the anatase type $TiO_2$, the rutile type $TiO_2$ and $Li_2TiO_3$ from remaining unreacted. As a result, it is possible to obtain the lithium-titanium composite oxide having a small crystallite diameter and low in the impurity phase content. It should also be noted that since the lithium-titanium composite oxide contains an element X consisting of at least one of Na and K, the stability of the crystal structure is enhanced so as to improve the charge-discharge cycle characteristics of the nonaqueous electrolyte battery. Also, it is possible to improve the ionic conductivity of the lithium-titanium composite oxide.

It is desirable for the lithium-titanium composite oxide to contain the element X, i.e., (Na+K), in an amount not smaller than 0.10% by weight and not larger than 3.04% by weight based on the amount of the lithium-titanium composite oxide. If the amount of (Na+K) contained in the lithium-titanium composite oxide is smaller than 0.10% by weight, it is difficult to obtain a sufficient effect of suppressing the crystal growth. It is also difficult to obtain a sufficient effect of stabilizing the crystal structure and of improving the ionic conductivity. On the other hand, if the amount of (Na+K) is larger than 3.04% by weight, it is possible for the Spinel type lithium titanate containing Na and K to form an impurity phase so as to lower the electric capacity of the nonaqueous electrolyte battery. It should be noted in this connection that the phenomenon noted above is brought about because Li is possibly substituted by the element X and the element X can be positioned in the sites of Li of the Spinel type lithium titanate.

It is possible for each of Na and K to be positioned in the Li sites of the Spinel type lithium titanate. This can be confirmed by applying an X-ray diffraction measurement to the lithium-titanium composite oxide so as to perform the Rietveld analysis. For performing the Rietveld analysis, it is possible to use, for example, RIETAN (trade name of an analytical software). If Na or K is positioned in the Li site of the Spinel type lithium titanate, the stability of the crystal structure can be further improved and, at the same time, the segregation can be suppressed.

It is desirable for the lithium-titanium composite oxide to contain K in an amount larger than that of Na because K produces a higher effect of promoting the crystallization and, thus, permits shortening the sintering time.

Incidentally, it is possible to use titanium oxide containing a prescribed amount of Na or K as the raw material in the manufacturing process in place of allowing sodium hydroxide and/or potassium hydroxide to be dissolved in water.

It is possible to use, for example, acetylene black, carbon black, graphite, etc. as the negative electrode conductive agent for enhancing the current collecting performance and for suppressing the contact resistance between the current collector and the active material.

It is possible to use, for example, polytetrafluoroethylene (PTFE), polyvinylidene fluoride (PVdF), a fluorinated rubber, a styrene-butadiene rubber, etc. as the binder for bonding the negative electrode active material to the negative electrode conductive agent.

Concerning the mixing ratio of the negative electrode active material, the negative electrode conductive agent, and the binder, it is desirable for the negative electrode active material to be used in an amount not smaller than 70% by weight and not larger than 96% by weight, for the negative electrode conductive agent to be used in an amount not smaller than 2% by weight and not larger than 28% by weight, and for the binder to be used in an amount not smaller than 2% by weight and not larger than 28% by weight. If the mixing amount of the negative electrode conductive agent is smaller than 2% by weight, the current collecting performance of the negative electrode layer may be lowered so as to possibly lower the large current characteristics of the nonaqueous electrolyte battery. Also, if the mixing amount of the binder is smaller than 2% by weight, the bonding between the negative electrode layer and negative electrode current collector may be lowered so as to possibly lower the charge-discharge cycle characteristics of the nonaqueous electrolyte battery. On the other hand, it is desirable for the mixing amount of each of the negative electrode conductive agent and the binder to be not larger than 28% by weight in view of the improvement in the capacity of the nonaqueous electrolyte battery.

It is desirable for the negative electrode current collector to be formed of an aluminum foil that is electrochemically stable within the potential range nobler than 1.0 V or an aluminum alloy foil containing an element such as Mg, Ti, Zn, Mn, Fe, Cu, or Si.

The negative electrode can be prepared by, for example, coating a negative electrode current collector with a slurry prepared by suspending a negative electrode active material, a negative electrode conductive agent and a binder in a solvent, followed by drying the coated slurry so as to form a negative electrode layer on the negative electrode current collector and subsequently pressing the current collector having the negative electrode layer formed thereon. Alternatively, it is also possible to form a mixture of a negative electrode active material, a negative electrode conductive agent and a binder into pellets for forming a negative electrode layer.

2) Nonaqueous Electrolyte

The nonaqueous electrolyte includes a liquid nonaqueous electrolyte that is prepared by dissolving an electrolyte in an organic solvent and a gel-like nonaqueous electrolyte that is prepared by using a composite material containing a liquid nonaqueous electrolyte and a polymer material.

The liquid nonaqueous electrolyte can be prepared by dissolving an electrolyte in an organic solvent in a concentration not lower than 0.5 mol/L and not higher than 2.5 mol/L.

The electrolyte includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bis-trifluoromethyl sulfonyl imide lithium [$LiN(CF_3SO_2)_2$], and a mixture thereof. It is desirable to use an electrolyte that is unlikely to be oxidized under a high potential. Particularly, it is most desirable to use $LiPF_6$ as the electrolyte.

The organic solvent includes, for example, cyclic carbonates such as propylene carbonate (PC), ethylene carbonate (EC) and vinylene carbonate; linear carbonates such as diethyl carbonate (DEC), dimethyl carbonate (DMC) and methyl ethyl carbonate (MEC); cyclic ethers such as tetrahydrofuran (THF), 2-methyl tetrahydrofuran (2Me THF) and dioxolane (DOX); linear ethers such as dimethoxy ethane (DME), and diethoxy ethane (DEE); as well as γ-butyrolactone (GBL), acetonitrile (AN) and sulfolane (SL). These solvents can be used singly or in the form of a mixed solvent.

The polymer materials include, for example, polyvinylidene fluoride (PVdF), polyacrylonitrile (PAN) and polyethylene oxide (PEO).

It is desirable to use a mixed solvent prepared by mixing at least two organic solvents selected from the group consisting of propylene carbonate (PC), ethylene carbonate (EC) and γ-butyrolactone (GBL). Further, it is more desirable to use the organic solvent containing γ-butyrolactone (GBL).

It should be noted that the lithium-titanium composite oxide permits absorbing-releasing lithium ions in the potential region in the vicinity of 1.5V (vs. Li/Li$^+$). However, in the potential region noted above, the nonaqueous electrolyte is unlikely to be decomposed by reduction, and a film consisting of the reduction product of the nonaqueous electrolyte is unlikely to be formed on the surface of the lithium-titanium composite oxide. Such being the situation, if the nonaqueous electrolyte battery is stored under the state that lithium ions have been inserted, i.e., under the charged state, the lithium ions inserted in the lithium-titanium composite oxide are gradually diffused into the liquid electrolyte so as to bring about a so-called "self-discharge". The self-discharge is rendered prominent with increase in the temperature of the storing environment of the battery.

As described above, the lithium-titanium composite oxide in this embodiment of the present invention has a small crystallite diameter so as to increase the crystal boundary area per unit weight. As a result, the self-discharge is rendered somewhat prominent in the lithium-titanium composite oxide, compared with the conventional material.

It should be noted in this connection that γ-butyrolactone is likely to be reduced, compared with the linear carbonate or the cyclic carbonate. To be more specific, the organic solvents are likely to be reduced in the order of γ-butyrolactone>>>ethylene carbonate>propylene carbonate>>dimethyl carbonate>methyl ethyl carbonate>diethyl carbonate. Incidentally, the degree of difference in the reactivity between the solvents is denoted by the number of signs of inequality (>).

Such being the situation, in the case where the liquid electrolyte contains γ-butyrolactone, a good film can be formed on the surface of the lithium-titanium composite oxide even under the operable potential region of the lithium-titanium composite oxide. As a result, the self-discharge can be suppressed so as to improve the storage characteristics of the nonaqueous electrolyte battery under high temperatures. This is also the case with the mixed solvents referred to above.

In order to form a better protective film, it is desirable for γ-butyrolactone to be contained in an amount not smaller than 40% by volume and not larger than 95% by volume of the organic solvent.

It is also possible to use an ionic liquid containing lithium ions, a polymer solid electrolyte, and an inorganic solid electrolyte as the nonaqueous electrolyte.

The ionic liquid denotes a compound, which can be present in the form of a liquid material under room temperature (15° C. to 25° C.) and which contains an organic cation and an organic anion. The ionic liquid noted above includes, for example, an ionic liquid that can be present singly in the form of a liquid material, an ionic liquid that can be converted into a liquid material when mixed with an electrolyte, and an ionic liquid that can be converted into a liquid material when dissolved in an organic solvent. Incidentally, the ionic liquid, which is used in the nonaqueous electrolyte battery, can have a melting point not higher than 25° C. Also, the organic cation forming the ionic liquid in question can have a quaternary ammonium skeleton.

The polymer solid electrolyte is prepared by dissolving an electrolyte in a polymer material, followed by solidifying the resultant solution.

Further, the inorganic solid electrolyte denotes a solid material exhibiting a lithium ion conductivity.

3) Positive Electrode

The positive electrode comprises a positive electrode current collector and a positive electrode layer formed on one surface or both surfaces of the positive electrode current collector and containing a positive electrode active material, a positive electrode conductive agent and a binder.

The positive electrode active material includes, for example, an oxide and a polymer.

The oxides include, for example, manganese dioxide ($MnO_2$) absorbing Li, iron oxide, copper oxide, nickel oxide, a lithium-manganese composite oxide such as $Li_xMn_2O_4$ or $Li_xMnO_2$, a lithium-nickel composite oxide such as $Li_xNiO_2$, a lithium-cobalt composite oxide such as $Li_xCoO_2$, a lithium-nickel-cobalt composite oxide such as $LiNi_{1-y}Co_yO_2$, a lithium-manganese-cobalt composite oxide such as $LiMn_yCo_{1-y}O_2$, the Spinel type lithium-manganese-nickel composite oxide such as $Li_xMn_{2-y}Ni_yO_4$, a lithium phosphate oxide having an olivine structure such as $Li_xFePO_4$, $Li_xFe_{1-y}Mn_yPO_4$, or $Li_xCoPO_4$, an iron sulfate such as $Fe_2(SO_4)_3$, and vanadium oxide such as $V_2O_5$.

The polymer includes, for example, a conductive polymer material such as polyaniline or polypyrrole, and a disulfide series polymer material. It is also possible to use sulfur (S), a fluorocarbon, etc. as the positive electrode active material.

The positive electrode active material that is desirable includes, for example, a lithium-manganese composite oxide (e.g., $Li_xMn_2O_4$), a lithium-nickel composite oxide (e.g., $Li_xNiO_2$), a lithium-cobalt composite oxide (e.g., $Li_xCoO_2$), a lithium-nickel-cobalt composite oxide (e.g., $Li_xNi_{1-y}Co_yO_2$), the Spinel type lithium-manganese-nickel composite oxide (e.g., $Li_xMn_{2-y}Ni_yO_4$), a lithium-manganese-cobalt composite oxide (e.g., $Li_xMn_yCo_{1-y}O_2$), a lithium-nickel-cobalt-manganese composite oxide (e.g., $Li_xNi_{1-y-z}Co_yMn_zO_2$) and lithium iron phosphate (e.g., $Li_xFePO_4$). The positive electrode active materials exemplified above make it possible to obtain a high positive electrode voltage. Incidentally, it is desirable for each of the molar ratios x, y and z in the chemical formulas given above to fall within a range of 0 to 1.

It is also desirable to use a compound represented by $Li_aNi_bCo_cMn_dO_2$, where the molar ratios a, b, c and d are $0 \leq a \leq 1.1$, $0.1 \leq b \leq 0.5$, $0 \leq c \leq 0.9$, and $0.1 \leq d \leq 0.5$). Incidentally, Li and Co are optional components of the compound given above. It is more desirable for the molar ratios b, c and d in the structural formula given above to fall with the ranges of: $0.3 \leq b \leq 0.4$, $0.3 \leq c \leq 0.4$, and $0.3 \leq d \leq 0.4$.

Since the positive electrode active materials exemplified above exhibit a high ionic conductivity, the diffusion of the lithium ions within the positive electrode active material is unlikely to provide the rate-determining step when the positive electrode active material is used in combination with the negative electrode active material specified in this embodiment of the present invention so as to make it possible to further improve the large current characteristics.

It is desirable for the positive electrode active material to have the primary particle diameter not smaller than 100 nm and not larger than 1 μm. If the primary particle diameter is not smaller than 100 nm, the positive electrode active material can be handled easily in the industrial manufacture of the nonaqueous electrolyte battery. On the other hand, if the primary particle diameter is not larger than 1 μm, the diffusion of the lithium ions within the particle can be proceeded smoothly.

It is desirable for the positive electrode active material to have a specific surface area not smaller than 0.1 $m^2/g$ and not larger than 10 $m^2/g$. If the specific surface area of the positive electrode active material is not smaller than 0.1 $m^2/g$, it is possible to secure sufficiently the absorption-release sites of the lithium ions. On the other hand, if the specific surface area of the positive electrode active material is not larger than 10 $m^2/g$, the positive electrode active material can be handled easily in the industrial manufacture of the nonaqueous electrolyte battery, and it is possible to secure a satisfactory charge-discharge cycle life of the nonaqueous electrolyte battery.

The positive electrode conductive agent permits enhancing the current collecting performance and also permits suppressing the contact resistance between the current collector and the active material. The positive electrode conductive agent includes, for example, a carbonaceous material such as acetylene black, carbon black and graphite.

The binder for bonding the positive electrode active material to the positive electrode conductive agent includes, for example, polytetrafluoroethylene (PTFE), polyvinylidene fluoride (PVdF) and a fluorinated rubber.

Concerning the mixing ratio of the positive electrode active material, the positive electrode conductive agent, and the binder, it is desirable for the mixing amount of the positive electrode active material to be not smaller than 80% by weight and not larger than 95% by weight, for the mixing amount of the positive electrode conductive agent to be not smaller than 3% by weight and not larger than 18% by weight, and for the mixing amount of the binder to be not smaller than 2% by weight and not larger than 17% by weight. If the positive electrode conductive agent is mixed in an amount not smaller than 3% by weight, it is possible to obtain the effects described above. On the other hand, if the mixing amount of the positive electrode conductive agent is not larger than 18% by weight, it is possible to suppress the decomposition of the nonaqueous electrolyte on the surface of the positive electrode conductive agent during storage of the nonaqueous electrolyte battery under high temperatures. Further, where the binder is used in an amount not smaller than 2% by weight, it is possible to obtain a sufficient electrode strength. On the other hand, where the mixing amount of the binder is not larger than 17% by weight, it is possible to decrease the mixing amount of the insulator in the electrode so as to decrease the internal resistance of the nonaqueous electrolyte battery.

It is desirable for the positive electrode current collector to be formed of an aluminum foil or an aluminum alloy foil containing at least one element selected from the group consisting of Mg, Ti, Zn, Mn, Fe, Cu, and Si.

The positive electrode can be prepared by coating a positive electrode current collector with a slurry prepared by, for example, suspending a positive electrode active material, a positive electrode conductive agent and a binder in a suitable solvent, followed by drying the coated slurry so as to form a positive electrode layer, and subsequently pressing the positive electrode current collector having the positive electrode layer formed thereon. Alternatively, it is also possible to form a mixture of a positive electrode active material, a positive electrode conductive agent and a binder into pellets, which are used for forming the positive electrode layer.

4) Separator

The separator includes, for example, a porous film including polyethylene, polypropylene, cellulose and/or polyvinylidene fluoride (PVdF), and an unwoven fabric made of a synthetic resin. Particularly, it is desirable in view of the improvement in safety to use a porous film made of polyethylene or polypropylene because the particular porous film can be melted under a prescribed temperature so as to break the current.

5) Case

The case is formed of a laminate film having a thickness of, for example, 0.2 mm or less, or a metal sheet having a thickness of, for example, 0.5 mm or less. It is more desirable for the metal sheet to have a thickness of 0.2 mm or less. Also, the case has a flattened shape, an angular shape, a cylindrical shape, a coin shape, a button shape or a sheet shape, or is of a laminate type. The case includes a case of a large battery mounted to, for example, an electric automobile having two to four wheels in addition to a small battery mounted to a portable electronic device.

The laminate film includes, for example, a multi-layered film including a metal layer and a resin layer covering the metal layer. For decreasing the weight of the battery, it is desirable for the metal layer to be formed of an aluminum foil or an aluminum alloy foil. On the other hand, the resin layer for reinforcing the metal layer is formed of a polymer material such as polypropylene (PP), polyethylene (PE), Nylon, and polyethylene terephthalate (PET). The laminate film case can be obtained by bonding the periphery of superposed laminate films by the thermal fusion.

It is desirable for the metal case to be formed of aluminum or an aluminum alloy. Also, it is desirable for the aluminum alloy to be an alloy containing an element such as magnesium, zinc or silicon. On the other hand, it is desirable for the amount of the transition metals, which are contained in the aluminum alloy, such as iron, copper, nickel and chromium, to be not larger than 100 ppm.

6) Negative Electrode Terminal

The negative electrode terminal is formed of a material exhibiting an electrical stability and conductivity within the range of 1.0 V to 3.0 V of the potential relative to the lithium ion metal. To be more specific, the material used for forming the negative electrode terminal includes, for example, aluminum and an aluminum alloy containing Mg, Ti, Zn, Mn, Fe, Cu or Si. In order to lower the contact resistance relative to the negative electrode current collector, it is desirable for the negative electrode terminal to be formed of a material equal to the material used for forming the negative electrode current collector.

7) Positive Electrode Terminal

The positive electrode terminal is formed of a material exhibiting an electrical stability and conductivity within the range of 3.0 V to 4.25 V of the potential relative to the lithium ion metal. To be more specific, the material used for forming the positive electrode terminal includes, for example, aluminum and an aluminum alloy containing Mg, Ti, Zn, Mn, Fe, Cu or Si. In order to lower the contact resistance relative to the positive electrode current collector, it is desirable for the positive electrode terminal to be formed of a material equal to the material used for forming the positive electrode current collector.

Figure 5:
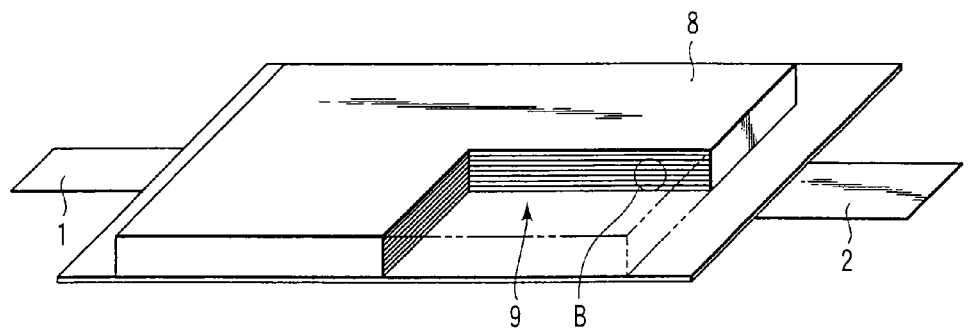
FIG. 5 is an oblique view, partly broken away, schematically showing the construction of another unit cell according to the first embodiment of the present invention.
Figure 6:
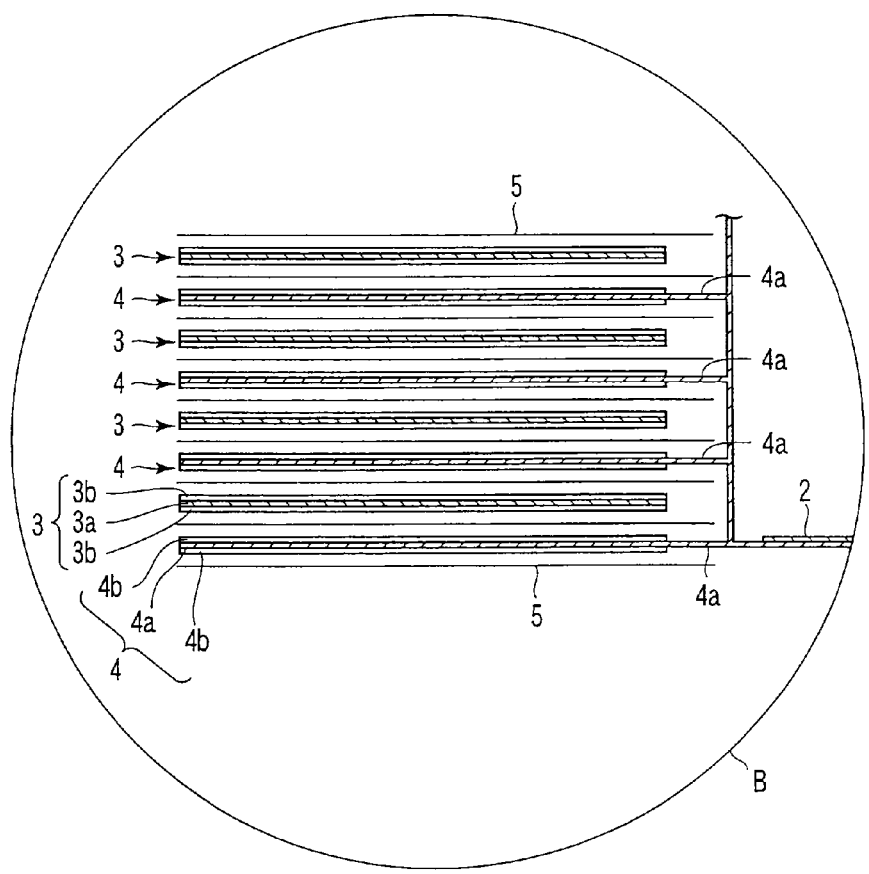
FIG. 6 is a cross sectional view showing in a magnified fashion the construction of the circular portion B shown in FIG. 5.

The construction of the nonaqueous electrolyte battery according to the first embodiment of the present invention is not limited to that shown in FIGS. 1A and 1B. For example, it is possible for the nonaqueous electrolyte battery according to the first embodiment of the present invention to be constructed as shown in FIGS. 5 and 6. To be more specific, FIG. 5 is an oblique view, partly broken away, schematically showing the construction of another flattened type nonaqueous electrolyte secondary battery according to the first embodiment of the present invention, and FIG. 6 is a cross sectional view showing in a magnified fashion the construction in the circular portion B shown in FIG. 5.

As shown in FIG. 5, a laminate type electrode group 9 is housed in a case 8 formed of a laminate film. As shown in FIG. 6, the laminate type electrode group 9 comprises a positive electrode 3 and a negative electrode 4, which are laminated one upon the other with a separator 5 interposed between the positive electrode 3 and the negative electrode 4. Each of a plurality of positive electrodes 3 includes a positive electrode current collector 3a and positive electrode layers 3b formed on both surfaces of the positive electrode current collector 3a and containing a positive electrode active material. Likewise, each of a plurality of negative electrodes 4 includes a negative electrode current collector 4a and negative electrode layers 4b formed on both surfaces of the negative electrode current collector 4a and containing a negative electrode active material. One side of the negative electrode current collector 4a included in each negative electrode 4 protrudes from the positive electrode 3. The negative electrode current collector 4a protruding from the positive electrode 3 is electrically connected to a band-like negative electrode terminal 2. The distal end portion of the band-like negative electrode terminal 2 is withdrawn from the case 8 to the outside. Also, one side of the positive electrode current collector 3a included in the positive electrode 3 is positioned on the side opposite to the protruding side of the negative electrode current collector 4a and is protruded from the negative electrode 4, though the particular construction is not shown in the drawing. The positive electrode current collector 3a protruding from the negative electrode 4 is electrically connected to a band-like positive electrode terminal 1. The distal end portion of the band-like positive electrode terminal 1 is positioned on the side opposite to the side of the negative electrode terminal 2 and is withdrawn from the side of the case 8 to the outside.

Second Embodiment

A battery pack according to a second embodiment of the present invention comprises the nonaqueous electrolyte battery according to the first embodiment of the present invention as a unit cell, and a plurality of unit cells are included in the battery pack according to the second embodiment of the present invention. The unit cells are arranged in series or in parallel so as to form a battery module.

The unit cell according to the first embodiment of the present invention is adapted for the preparation of the battery module. Also, the battery pack according to the second embodiment of the present invention is excellent in its charge-discharge cycle characteristics as described in the following.

In the lithium-titanium composite oxide, the phase having an irregular crystal structure is increased with decrease in the crystallite diameter. As a result, the variation of the negative electrode potential at the charge-discharge terminal and, thus, the variation of the battery voltage at the charge-discharge terminal, is rendered small so as to decrease the nonuniformity in the battery voltage in the battery module. It follows that the battery pack according to the second embodiment of the present invention can control the battery voltage easily to make it possible to improve the charge-discharge cycle characteristics. The nonuniformity in the battery voltage in the battery module is brought about due to the difference in capacity among the individual batteries and tends to be rendered large when the battery module of a series connection is fully charged.

An example of the battery pack according to the second embodiment of the present invention will now be described with reference to FIGS. 2 and 3.

Figure 2:
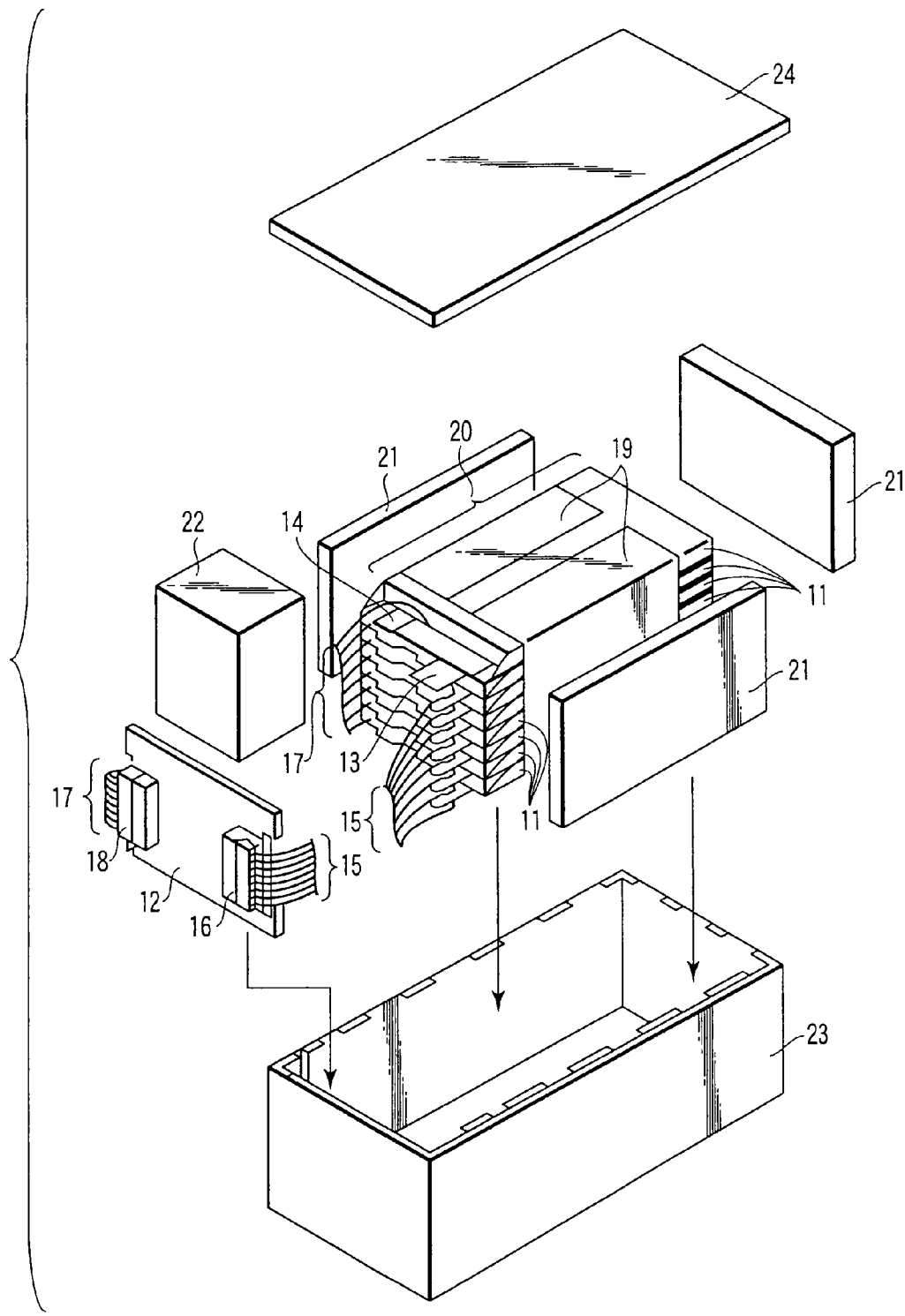
FIG. 2 is an oblique view showing in a dismantled fashion the construction of a battery pack according to a second embodiment of the present invention.

FIG. 2 is an oblique view showing in a dismantled fashion the construction of the battery pack according to the second embodiment of the present invention.

As shown in FIG. 2, a plurality of plate-like unit cells 11, e.g., 8 unit cells 11, are laminated one upon the other so as to form a parallelepiped laminate body 20 forming a battery module. As described previously, each of the unit cells 11 is constructed such that the positive electrode terminal 13 and the negative electrode terminal 14 connected to the positive electrode and the negative electrode, respectively, are withdrawn to the outside of the case. A printed wiring board 12 is arranged on the side toward which the positive electrode terminal 13 and the negative electrode terminal 14 are allowed to protrude.

The positive electrode terminal 13 is electrically connected to a connector 16 on the side of the positive electrode via a wiring 15 on the side of the positive electrode. Likewise, the negative electrode terminal 14 is electrically connected to a connector 18 on the side of the negative electrode via a wiring 17 on the side of the negative electrode. The connectors 16, 18 on the side of the positive electrode and the negative electrode, respectively, are connected to the counterpart connectors mounted to the printed wiring board 12.

The laminate body 20 of the unit cells 11 is fixed by adhesive tapes 19. Protective sheets 21 each formed of rubber or a resin are arranged to cover the three side surfaces of the laminate body 20 except the side toward which protrude the positive electrode terminal 13 and the negative electrode terminal 14. Also, a protective block 22 formed of rubber or a resin is arranged in the clearance between the side of the laminate body 20 and the printed wiring board 12.

The laminate body 20 is housed in a housing vessel 23 together with the protective sheets 21, the protective block 22 and the printed wiring board 12. Also, a lid 24 is mounted to close the upper open portion of the housing vessel 23.

Each constituent of the battery pack according to the second embodiment of the present invention will now be described in detail.

Figure 3:
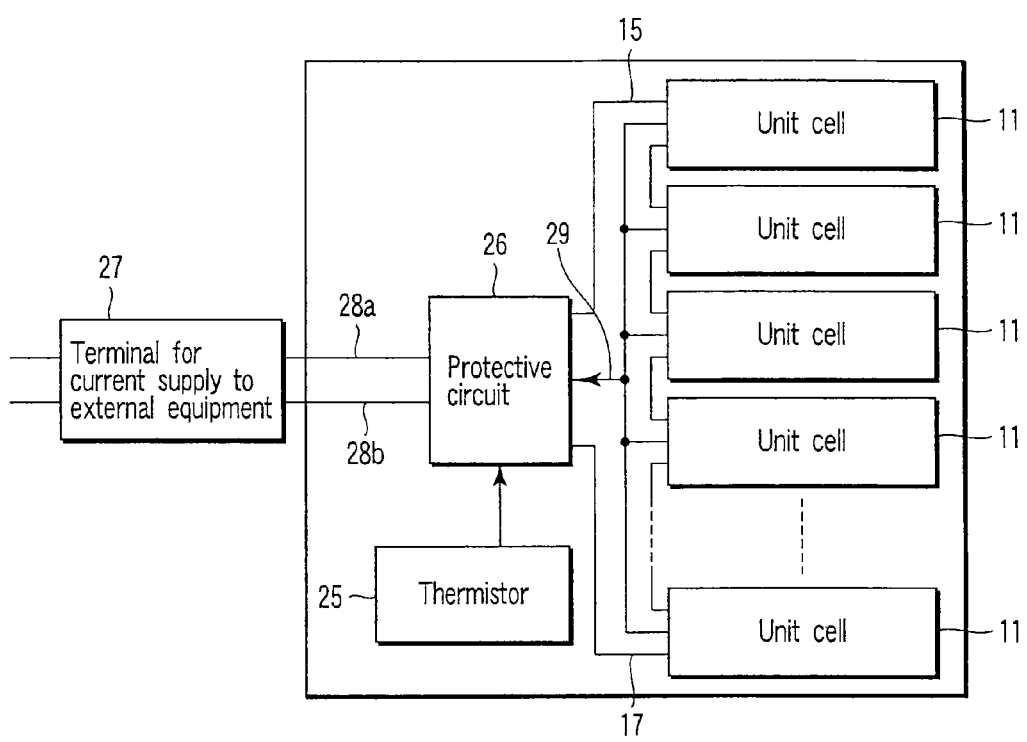
FIG. 3 is a block diagram showing the electric circuit of the battery pack according to the second embodiment of the present invention.

As shown in FIG. 3, a thermistor 25, a protective circuit 26, and a terminal 27 for the current supply to the external apparatus are mounted to the printed wiring board 12.

The thermistor 25 serves to detect the temperature of the unit cell 11. The signal denoting the detected temperature is transmitted to the protective circuit 26.

As shown in FIG. 3, the protective circuit 26 is capable of breaking under prescribed conditions wirings 28a and 28b stretched between the protective circuit 26 and the terminal 27 for the current supply to the external apparatus. The prescribed conditions noted above include, for example, the case where the temperature detected by the thermistor 25 is higher than a prescribed temperature and the case of detecting, for example, the over-charging, the over-discharging and the over current of the unit cell 11. In the case of detecting the individual unit cells 11, it is possible to detect the battery voltage, the positive electrode potential or the negative electrode potential. Incidentally, in the case of detecting the electrode potential, a lithium electrode used as a reference electrode is inserted into the unit cell 11. In the case of FIG. 3, the protective circuit 26 is provided with a battery voltage monitoring circuit section. Each of the unit cells 11 is connected to the battery voltage monitoring circuit section via a wiring 29. According to the particular construction, the battery voltage of each of the unit cells 11 can be detected by the protective circuit 26. Incidentally, FIG. 3 covers the case of applying the detection to the individual unit cells 11. However, it is also possible to apply the detection to the battery module 20. Further, in the case shown in FIG. 3, all the unit cells 11 included in the battery module 20 are detected in terms of voltage. Although it is particularly preferable that the voltages of all of the unit cells 11 of the battery module 20 should be detected, it may be sufficient to check the voltages of only some of the unit cells 11.

The battery pack according to the second embodiment of the present invention is excellent in the control of the positive electrode potential or the negative electrode potential by the detection of the battery voltage and, thus, is particularly adapted for the case where the protective circuit detects the battery voltage.

It is possible to use a thermally shrinkable tape in place of the adhesive tape 19. In this case, the protective sheets 21 are arranged on both sides of the laminate body 20 and, after the thermally shrinkable tube is wound about the protective sheets 21, the thermally shrinkable tube is thermally shrunk so as to bond the laminate body 20.

Incidentally, FIG. 2 shows that the unit cells 11 are connected in series. However, it is also possible to connect the unit cells 11 in parallel so as to increase the capacity of the battery pack. Of course, it is also possible to connect the assembled battery packs in series and in parallel.

The unit cell 11 used in the battery pack shown in FIGS. 2 and 3 is formed of the flattened type nonaqueous electrolyte battery shown in FIG. 1. However, the unit cells constituting the battery pack are not limited to the nonaqueous electrolyte battery shown in FIG. 1. For example, it is also possible to use the flattened type nonaqueous electrolyte battery shown in FIGS. 5 and 6 for forming the battery pack according to the second embodiment of the present invention.

The construction of the battery pack can be changed appropriately depending on the use of the battery pack.

It is desirable for the battery pack according to the second embodiment of the present invention to be used in the field requiring the large current characteristics and the charge-discharge cycle characteristics. To be more specific, it is desirable for the battery pack according to the second embodiment of the present invention to be used in the power source for a digital camera and for the vehicles such as the hybrid electric automobiles having two to four wheels, electric automobiles having two to four wheels, and the assist bicycles.

Incidentally, where the nonaqueous electrolyte contains γ-butyrolactone (GBL) or a mixed solvent containing at least two organic solvents selected from the group consisting of propylene carbonate (PC), ethylene carbonate (EC) and γ-butyrolactone (GBL), it is desirable for the battery pack to be used in the field requiring the high temperature characteristics, i.e., for the battery pack mounted to a vehicle.

The present invention will now be described with reference to Examples of the present invention. Needless to say, the technical scope of the present invention is not limited to the following Examples as far as the subject matter of the present invention is not exceeded.

Rapid Charging Test

Example 1

Preparation of Positive Electrode

In the first step, a slurry was prepared by adding 90% by weight of a lithium-cobalt composite oxide ($LiCoO_2$) used as a positive electrode active material, 5% by weight of acetylene black used as a conductive agent, and 5% by weight of polyvinylidene fluoride (PVdF) used as a binder to N-methyl pyrrolidone (NMP), followed by coating the both surfaces of an aluminum foil having thickness of 15 μm with the resultant slurry and subsequently drying and, then, pressing the current collector coated with the slurry so as to obtain a positive electrode having an electrode density of 3.3 g/cm$^3$.

<Preparation of Lithium-Titanium Composite Oxide>

In the first step, an anatase type titanium oxide was put in a solution prepared by dissolving lithium hydroxide, 0.0112 g of sodium hydroxide and 0.1336 g of potassium hydroxide in a pure water, followed by stirring and drying the reaction system. Further, the dried reaction system was baked under the air atmosphere at 780° C. for 10 hours so as to obtain a lithium-titanium composite oxide having a spinel structure and a chemical formula of $Li_4Ti_5O_{12}$ and containing 0.03% by weight of Na and 0.42% by weight of K. The crystallite diameter of the lithium-titanium composite oxide thus obtained was found to be 582 Å.

<Measurement of Crystallite Diameter and Strength Ratio of Main Peaks>

Figure 4:
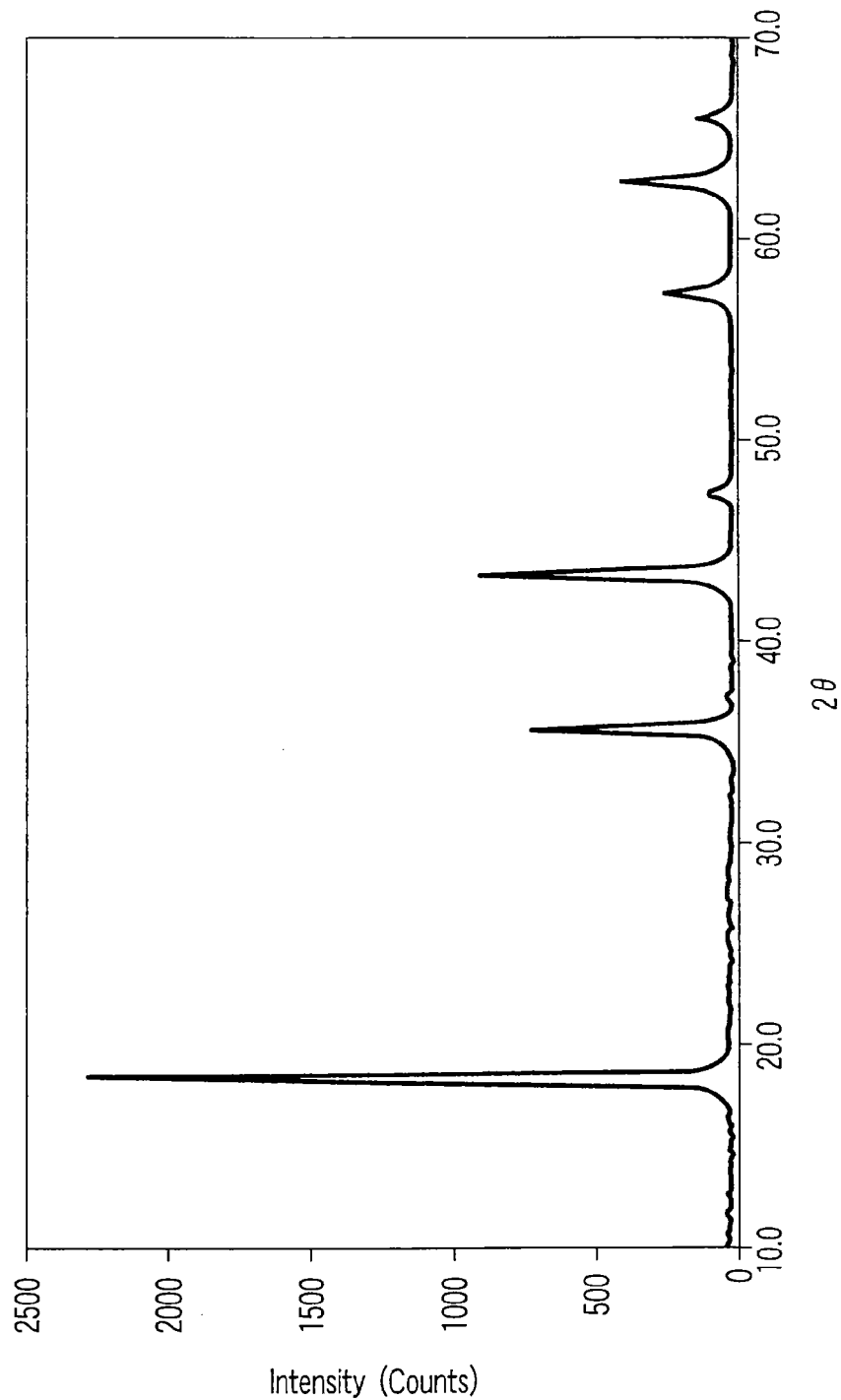
FIG. 4 is a graph showing the X-ray diffraction pattern of the lithium-titanium composite oxide for the Example of the present invention.

In the first step, the X-ray diffraction pattern using Cu—Kα of the lithium-titanium composite oxide was obtained by using XRD (type number M18XHF$^{22}$-SRA, manufactured by Mac Science Inc.). FIG. 4 exemplifies the X-ray diffraction pattern of the lithium-titanium composite oxide for this Example. Incidentally, the X-ray diffraction pattern having the background and the Kα$_2$ line removed therefrom was used in the subsequent analysis.

The crystallite diameter was obtained by formula (1) given below (Scherrer formula) by calculating the half value width of the X-ray diffraction peak of the (111) plane of the diffraction angle (2 θ) of 18°. Incidentally, for calculating the half value width of the diffraction peak, it is necessary to correct the line width that varies by the change of the optical system of the diffraction apparatus. A standard silicon powder was used for this correction.

$$D_{hkl}=(K \cdot \lambda)/(\beta \cdot \cos \theta) \quad (1)$$

where $D_{hkl}$ denotes the crystallite diameter (Å), λ denotes the wavelength (Å) of the X-ray used for the measurement, β denotes the broadening of the diffraction angle, θ denotes the Bragg angle of the diffraction angle; and K denotes a constant (0.9).

The intensity ratio of main peaks of the anatase type $TiO_2$, the rutile type $TiO_2$ and $Li_2TiO_3$, respectively, was calculated from the X-ray diffraction pattern on the basis that the peak intensity of main peak of $Li_4Ti_5O_{12}$ was set at 100. Incidentally, the main peak of $Li_4Ti_5O_{12}$ was a peak at 4.83 Å (2θ: 18°). The main peak of the anatase type $TiO_2$ was a peak at 3.51 Å (2θ:25°). The main peak of the rutile type $TiO_2$ was a peak at 3.25 Å (2θ:27°). The main peak of $Li_2TiO_3$ was a peak at 2.07 Å (2θ:43°).

<Manufacture of Negative Electrode>

A slurry was prepared by adding 90% by weight of the obtained lithium-titanium composite oxide powder, which was used as the negative electrode active material, 5% by weight of coke baked at 1,200° C. (the layer spacing $d_{002}$ of 0.3465 nm and the average particle diameter of 3 μm), which was used as the negative electrode conductive agent, and 5% by weight of polyvinylidene fluoride (PVdF) used as a binder to N-methyl pyrrolidone (NMP), followed by coating the both surfaces of an aluminum foil having thickness of 15 μm, which was used as a negative electrode current collector, with the resultant slurry, and subsequently drying and, then, pressing the aluminum foil having the dried slurry layers formed thereon so as to obtain a negative electrode having an electrode density of 2.0 g/cm³.

Incidentally, the lithium-titanium composite oxide powder was found to have an average particle diameter of 0.82 μm. The average particle diameter of the lithium-titanium composite oxide powder was measured as follows.

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, so as to analyze the particle size distribution data.

<Manufacture of Electrode Group>

A laminate structure was prepared by disposing a positive electrode, a separator formed of a porous polyethylene film having a thickness of 25 μm, a negative electrode and another separator one upon the other in the order mentioned, followed by spirally winding the laminate structure thus prepared. The wound laminate structure was pressed under heat of 90° C. so as to obtain a flattened electrode group having a width of 30 mm and a thickness of 3.0 mm. The electrode group thus prepared was housed in a pack formed of a laminate film having a thickness of 0.1 mm and including an aluminum foil having a thickness of 40 μm and a polypropylene layer formed on each surface of the aluminum foil. The electrode group housed in the pack was subjected to a vacuum drying at 80° C. for 24 hours.

<Preparation of Liquid Nonaqueous Electrolyte>

A liquid nonaqueous electrolyte was prepared by dissolving $LiBF_4$ used as an electrolyte in a mixed solvent prepared by mixing ethylene carbonate (EC) with γ-butyrolactone (GBL) in a mixing ratio by volume of 1:2. The electrolyte was dissolved in the mixed solvent in an amount of 1.5 mol/L.

After the liquid nonaqueous electrolyte was poured into a laminate film pack having the electrode group housed therein, the pack was perfectly closed by the heat seal so as to manufacture a nonaqueous electrolyte secondary battery constructed as shown in FIG. 1 and having a width of 35 mm, a thickness of 3.2 mm and a height of 65 mm.

Examples 2 to 14 and Comparative Example 1

A nonaqueous electrolyte secondary battery was manufactured as in Example 1, except that the addition amounts of Na and K were set as shown in Table 1, and that used was a lithium-titanium composite oxide having the crystallite diameter shown in Table 1.

Examples 15 to 19

A nonaqueous electrolyte secondary battery was manufactured as in Example 1, except that the baking temperature was set as shown in Table 1, and that used was a lithium-titanium composite oxide having the crystallite diameter shown in Table 1.

Comparative Examples 2 to 8

A nonaqueous electrolyte secondary battery was manufactured as in Example 1, except that the baking temperature was set as shown in Table 1, and that used was a lithium-titanium composite oxide having the crystallite diameter shown in Table 1.

Examples 20 to 25

A nonaqueous electrolyte secondary battery was manufactured as in Example 1 and Examples 15 to 19, except that used was $LiNi_{1/3}Co_{1/3}Mn_{1/3}O_2$ as the positive electrode active material.

A rapid charging performance was evaluated in respect of the nonaqueous electrolyte battery for each of Examples 1 to 25 and each of Comparative Examples 1 to 8. To be more specific, the battery discharged to reach the rated discharge voltage of 1.5 V under the current of 1 C was charged for 3 hours under the constant voltage of 2.8 V. The obtained charging capacity was regarded as the standard charging capacity. Tables 1 and 2 show the 80% charging time (seconds) required for charging 80% of the standard charging capacity.

Also, the electric capacity of the negative electrode was measured by a half cell test in which a lithium metal was used as the counter electrode. To be more specific, lithium ions were absorbed (charging) in the negative electrode under the current value of 0.1 mA/cm² to reach 1V (Li/Li⁺) with a lithium metal used for forming the counter electrode, followed by releasing the lithium ions (discharge) under the current value of 0.1 mA/cm² to reach 2V (Li/Li⁺) with the counter electrode. The discharge capacity in this stage was converted into the capacity per unit weight of the negative electrode active material. The converted value is also shown in Tables 1 and 2 as the negative electrode capacity.

TABLE 1

| | Baking temperature (° C.) | Na amount (% by weight) | K amount (% by weight) | (Na + K) amount (% by weight) | Crystallite diameter (Å) | Main peak intensity ratio | | | 80% charging time (seconds) | Negative electrode capacity (mAh/g) |
| | | | | | | Anatase type $TiO_2$ | Rutile type $TiO_2$ | $Li_2TiO_3$ | | |
|---|---|---|---|---|---|---|---|---|---|---|
| Example 1 | 780 | 0.032 | 0.423 | 0.455 | 582 | <1 | <1 | <1 | 109 | 167 |
| Example 2 | 780 | 0.022 | 0.074 | 0.096 | 694 | <1 | <1 | <1 | 124 | 165 |
| Example 3 | 780 | 0.028 | 0.074 | 0.102 | 688 | <1 | <1 | <1 | 121 | 164 |
| Example 4 | 780 | 0.029 | 0.084 | 0.113 | 671 | <1 | <1 | <1 | 120 | 165 |
| Example 5 | 780 | 0.040 | 0.087 | 0.127 | 601 | <1 | <1 | <1 | 120 | 165 |
| Example 6 | 780 | 0.033 | 0.215 | 0.248 | 592 | <1 | <1 | <1 | 117 | 165 |
| Example 7 | 780 | — | 0.453 | 0.453 | 590 | <1 | <1 | <1 | 112 | 166 |
| Example 8 | 780 | 0.080 | 0.696 | 0.776 | 578 | <1 | <1 | <1 | 113 | 167 |
| Example 9 | 780 | 0.254 | 0.773 | 1.027 | 565 | <1 | <1 | <1 | 106 | 167 |
| Example 10 | 780 | 0.780 | 1.146 | 1.926 | 551 | <1 | <1 | <1 | 101 | 166 |
| Example 11 | 780 | 1.254 | 1.052 | 2.306 | 545 | <1 | <1 | <1 | 98 | 165 |
| Example 12 | 780 | 2.331 | — | 2.331 | 530 | <1 | <1 | <1 | 92 | 166 |
| Example 13 | 780 | 0.893 | 1.920 | 2.813 | 529 | <1 | <1 | <1 | 91 | 164 |

TABLE 1-continued

|  | Baking temperature (° C.) | Na amount (% by weight) | K amount (% by weight) | (Na + K) amount (% by weight) | Crystallite diameter (Å) | Main peak intensity ratio | | | 80% charging time (seconds) | Negative electrode capacity (mAh/g) |
|---|---|---|---|---|---|---|---|---|---|---|
|  |  |  |  |  |  | Anatase type TiO$_2$ | Rutile type TiO$_2$ | Li$_2$TiO$_3$ |  |  |
| Example 14 | 780 | 1.021 | 2.023 | 3.044 | 527 | <1 | <1 | <1 | 91 | 160 |
| Example 15 | 760 | 0.032 | 0.423 | 0.455 | 442 | <1 | 2 | 2 | 68 | 167 |
| Example 16 | 740 | 0.032 | 0.423 | 0.455 | 313 | <1 | 2 | 2 | 64 | 167 |
| Example 17 | 720 | 0.032 | 0.423 | 0.455 | 261 | <1 | 3 | 3 | 61 | 166 |
| Example 18 | 710 | 0.032 | 0.423 | 0.455 | 203 | <1 | 5 | 3 | 64 | 164 |
| Example 19 | 700 | 0.032 | 0.423 | 0.455 | 151 | <1 | 7 | 3 | 69 | 163 |
| Comparative Example 1 | 780 | 0.012 | 0.028 | 0.040 | 1207 | <1 | <1 | <1 | 1080 | 158 |
| Comparative Example 2 | 760 | 0.012 | 0.028 | 0.040 | 1041 | <1 | 2 | 2 | 892 | 158 |
| Comparative Example 3 | 740 | 0.012 | 0.028 | 0.040 | 984 | <1 | 4 | 4 | 471 | 157 |
| Comparative Example 4 | 720 | 0.012 | 0.028 | 0.040 | 780 | <1 | 5 | 6 | 333 | 156 |
| Comparative Example 5 | 700 | 0.012 | 0.028 | 0.040 | 761 | 3 | 3 | 3 | 341 | 154 |
| Comparative Example 6 | 680 | 0.012 | 0.028 | 0.040 | 692 | 10 | 5 | 3 | 343 | 149 |
| Comparative Example 7 | 600 | 0.012 | 0.028 | 0.040 | 435 | 20 | 7 | 4 | 353 | 109 |
| Comparative Example 8 | 500 | 0.012 | 0.028 | 0.040 | 332 | 33 | 8 | 4 | 373 | 78 |

The following description is based on the values obtained by applying an appropriate effective numeral to the numeral values shown in each of Tables 1 and 2.

The 80% charging time for Examples 1 to 19 is shorter than that for Comparative Examples 1 to 8. The experimental data clearly support that the nonaqueous electrolyte battery according to the embodiment of the present invention is excellent in the rapid charging performance, i.e., in the large current characteristics.

The 80% charging time for Examples 12 to 19 is shorter than that for Examples 1 to 11. The experimental data clearly support that, if the crystallite diameter of the lithium-titanium composite oxide is not larger than $5.3 \times 10^2$ Å, the nonaqueous electrolyte battery is made more excellent in the rapid charging performance, i.e., in the large current characteristics.

The 80% charging time for Examples 15 to 19 is shorter than that for Examples 1 to 14. The experimental data clearly support that, if the crystallite diameter of the lithium-titanium composite oxide is not larger than $4.4 \times 10^2$ Å, the nonaqueous electrolyte battery is made furthermore excellent in the rapid charging performance, i.e., in the large current characteristics.

The 80% charging time for Example 17 is shorter than that for Examples 18 to 19. The experimental data clearly support that, if the main peak intensity of each of the rutile type TiO$_2$, the anatase type TiO$_2$ and Li$_2$TiO$_3$ is not larger than 3, the nonaqueous electrolyte battery is made more excellent in the rapid charging performance, i.e., in the large current characteristics.

Further, the crystallite diameter for Examples 1 to 19 is smaller than that for Comparative Example 1. The experimental data clearly support that, if the amount of (Na+K) is not smaller than 0.10% by weight and not larger than 3.04% by weight based on the amount of the lithium-titanium composite oxide, the lithium-titanium composite oxide having the crystallite diameter not larger than $6.9 \times 10^2$ Å and small in the amount of the impurity phase can be baked easily.

TABLE 2

|  | Baking temperature (° C.) | Na amount (% by weight) | K amount (% by weight) | (Na + K) amount (% by weight) | Crystallite diameter (Å) | Main peak intensity ratio | | | 80% charging time (seconds) | Negative electrode capacity (mAh/g) |
|---|---|---|---|---|---|---|---|---|---|---|
|  |  |  |  |  |  | Anatase type TiO$_2$ | Rutile type TiO$_2$ | Li$_2$TiO$_3$ |  |  |
| Example 20 | 780 | 0.032 | 0.423 | 0.455 | 582 | <1 | <1 | <1 | 87 | 167 |
| Example 21 | 760 | 0.032 | 0.423 | 0.455 | 442 | <1 | 2 | 2 | 54 | 167 |
| Example 22 | 740 | 0.032 | 0.423 | 0.455 | 313 | <1 | 2 | 2 | 51 | 167 |
| Example 23 | 720 | 0.032 | 0.423 | 0.455 | 261 | <1 | 3 | 3 | 48 | 166 |
| Example 24 | 710 | 0.032 | 0.423 | 0.455 | 203 | <1 | 5 | 3 | 51 | 164 |
| Example 25 | 700 | 0.032 | 0.423 | 0.455 | 151 | <1 | 7 | 3 | 55 | 163 |

The 80% charging time for Example 20 is shorter than that for Example 1. The experimental data clearly support that, in the case of using a compound represented by Li$_a$Ni$_b$Co$_c$Mn$_d$O$_2$ (where $0 \leq a \leq 1.1$, $0.1 \leq b \leq 0.5$, $0 \leq c \leq 0.9$, and $0.1 \leq d \leq 0.5$) as the positive electrode active material, the nonaqueous electrolyte battery is rendered more excellent in the rapid charging performance, i.e., in the large current characteristics.

This is also the case with each of Examples 21 to 25, as apparent from the comparison with Examples 15 to 19.

High Temperature Storage Test

Examples 26 to 29

A nonaqueous electrolyte secondary battery was manufactured as in Example 1, except that the solvent of the liquid electrolyte had a composition shown in Table 3.

The nonaqueous electrolyte secondary battery for each of Example 1 and Examples 26 to 29 was stored under the fully charged state in a constant temperature vessel maintained at 45° C., i.e., a constant temperature vessel type No. EC-45 MTP manufactured by Hitachi Ltd. so as to measure the remaining capacity after the storage for one month. Table 3 shows the ratio of the remaining capacity of the nonaqueous electrolyte secondary battery to the discharge capacity before the storage.

TABLE 3

| | First solvent/A | Second solvent/B | Solvent ratio (A:B) | Remaining capacity/ discharge capacity (%) |
|---|---|---|---|---|
| Example 1 | EC | GBL | 1:2 | 97 |
| Example 26 | EC | PC | 1:2 | 80 |
| Example 27 | EC | DMC | 1:2 | 74 |
| Example 28 | EC | MEC | 1:2 | 72 |
| Example 29 | EC | DEC | 1:2 | 70 |

The remaining capacity for each of Examples 1 and 26 is larger than that for any of Examples 27 to 29. The experimental data clearly support that, in the case of using a mixed solvent containing at least two organic solvents selected from the group consisting of propylene carbonate (PC), ethylene carbonate (EC) and γ-butyrolactone (GBL), it is possible to improve the high temperature storage characteristics of the nonaqueous electrolyte secondary battery.

The remaining capacity for Example 1 is larger than that for any of Examples 26 to 29. The experimental data clearly support that, in the case of using a solvent containing γ-butyrolactone (GBL), it is possible to improve further the high temperature storage characteristics of the nonaqueous electrolyte secondary battery.

Examples 30 to 33

A nonaqueous electrolyte secondary battery was manufactured as in Example 1, except that the solvent of the liquid electrolyte had a composition shown in Table 4. Incidentally, the solvent ratio shown in Table 4 denotes the volume ratio of the solvent. The abbreviation EC shown in Table 4 denotes ethylene carbonate, GBL denotes γ-butyrolactone, PC denotes propylene carbonate, and VC denotes vinylene carbonate.

The nonaqueous electrolyte secondary battery for each of Example 1, Example 26 and Examples 30 to 33 was stored under the fully charged state in a constant temperature vessel maintained at 60° C., i.e., a constant temperature vessel type No. EC-45 MTP manufactured by Hitachi Ltd., so as to measure the remaining capacity after the storage for one month. Table 4 shows the ratio of the remaining capacity of the nonaqueous electrolyte secondary battery to the discharge capacity before the storage.

TABLE 4

| | First solvent/A | Second solvent/B | Third solvent/C | Fourth solvent/D | Solvent ratio (A:B:C:D) | Remaining capacity/ discharge capacity |
|---|---|---|---|---|---|---|
| Example 1 | EC | GBL | — | — | 1:2 | 87 |
| Example 26 | EC | PC | — | — | 1:2 | 70 |
| Example 30 | EC | GBL | PC | — | 2:3:1 | 92 |
| Example 31 | EC | GBL | PC | — | 1:1:1 | 90 |
| Example 32 | EC | GBL | VC | — | 1:2:0.05 | 92 |
| Example 33 | EC | GBL | PC | VC | 2:3:1:0.05 | 94 |

As shown in Table 3 given previously, the high temperature storage characteristics of the nonaqueous electrolyte secondary battery under the temperature of about 45° C. can be improved in Examples 1 and 26 using two kinds of solvents selected from the group consisting of PC, EC and GBL. However, when it comes to the storage characteristics of the nonaqueous electrolyte secondary battery under a further higher temperature of 60° C., the secondary battery for Examples 30 to 33 using at least three kinds of solvents selected from the group consisting of PC, EC, GBL and VC is superior to the secondary battery for Examples 1 and 26, as apparent from Table 4. The experimental data clearly support that, in order to obtain a sufficient high temperature storage characteristics, it is desirable to use at least three kinds of solvents selected from the group consisting of PC, EC, GBL and VC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A nonaqueous electrolyte battery, comprising:
   a case;
   a positive electrode provided in the case and comprising at least one selected from the group consisting of spinel type lithium-manganese-nickel composite oxide and lithium phosphate oxide having an olivine structure;
   a negative electrode provided in the case and containing a lithium-titanium composite oxide comprising a crystallite diameter not larger than $6.9 \times 10^2$ Å; and
   a nonaqueous electrolyte provided in the case;
   wherein in a X-ray diffractometry curve of the lithium-titanium composite oxide, none of a main peak intensity of a rutile type $TiO_2$, a main peak intensity of an anatase type $TiO_2$ and a main peak intensity of $Li_2TiO_3$ is larger than 7 when a main peak intensity of a lithium titanate having a spinel structure is set at 100.

2. The nonaqueous electrolyte battery according to claim 1, wherein the crystallite diameter of the lithium-titanium composite oxide is not smaller than $1.5 \times 10^2$ Å.

3. The nonaqueous electrolyte battery according to claim 1, wherein the crystallite diameter of the lithium-titanium composite oxide is not smaller than $2.6 \times 10^2$ Å.

4. The nonaqueous electrolyte battery according to claim 1, wherein none of the main peak intensity of the rutile type $TiO_2$, the main peak intensity of the anatase type $TiO_2$ and the main peak intensity of $Li_2TiO_3$ is larger than 3.

5. The nonaqueous electrolyte battery according to claim 1, wherein the lithium-titanium composite oxide comprises an element X which consists of at least one of Na and K, and an amount of the element X is not smaller than 0.10% by weight and not larger than 3.04% by weight.

6. The nonaqueous electrolyte battery according to claim 5, wherein the element X is positioned in a Li site of lithium titanate.

7. The nonaqueous electrolyte battery according to claim 1, wherein the nonaqueous electrolyte comprises at least two solvents selected from the group consisting of propylene carbonate, ethylene carbonate and γ-butyrolactone.

8. The nonaqueous electrolyte battery according to claim 1, wherein the nonaqueous electrolyte comprises γ-butyrolactone.

9. The nonaqueous electrolyte battery according to claim 1, wherein the nonaqueous electrolyte comprises at least three solvents selected from the group consisting of propylene carbonate, ethylene carbonate, γ-butyrolactone, and vinylene carbonate.

10. The nonaqueous electrolyte battery according to claim 1, wherein the lithium-titanium composite oxide comprises particles having an average particle diameter not larger than 1 μm.

11. The nonaqueous electrolyte battery according to claim 1, wherein the positive electrode comprises a spinel type lithium-manganese-nickel composite oxide which is $Li_xMn_{2-y}Ni_yO_4$, wherein each of molar ratios x and y is a value from 0 (inclusive) to 1 (inclusive).

12. The nonaqueous electrolyte battery according to claim 1, wherein the positive electrode comprises a lithium phosphate oxide and the lithium phosphate oxide is at least one oxide selected from the group consisting of $Li_xFePO_4$, $Li_xFe_{1-y}Mn_yPO_4$ and $Li_xCoPO_4$, wherein each of molar ratios x and y is a value from 0 (inclusive) to 1 (inclusive).

13. A battery pack comprising nonaqueous electrolyte batteries,
each of the nonaqueous electrolyte batteries comprising:
a case;
a positive electrode provided in the case and comprising at least one selected from the group consisting of spinel type lithium-manganese-nickel composite oxide and lithium phosphate oxide having an olivine structure;
a negative electrode provided in the case and containing a lithium-titanium composite oxide comprising a crystallite diameter not larger than $6.9 \times 10^2$ Å; and
a nonaqueous electrolyte provided in the case;
wherein in a X-ray diffractometry curve of the lithium-titanium composite oxide, none of a main peak intensity of a rutile type $TiO_2$, a main peak intensity of an anatase type $TiO_2$ and a main peak intensity of $Li_2TiO_3$ is larger than 7 when a main peak intensity of a lithium titanate having a spinel structure is set at 100.

14. The battery pack according to claim 13, further comprising a protective circuit which detects a voltage of each of the nonaqueous electrolyte batteries.

15. The battery pack according to claim 13, wherein the positive electrode comprises a spinel type lithium-manganese-nickel composite oxide which is $Li_xMn_{2-y}Ni_yO_4$, wherein each of molar ratios x and y is a value from 0 (inclusive) to 1 (inclusive).

16. The battery pack according to claim 13, wherein the positive electrode comprises a lithium phosphate oxide and the lithium phosphate oxide is at least one oxide selected from the group consisting of $Li_xFePO_4$, $Li_xFe_{1-y}Mn_yPO_4$ and $Li_xCoPO_4$, wherein each of molar ratios x and y is a value from 0 (inclusive) to 1 (inclusive);
at least one oxide selected from the group consisting of $Li_xFePO_4$, $Li_xFe_{1-y}Mn_yPO_4$ and $Li_xCoPO_4$, as the lithium phosphate oxide, where each of molar ratios x and y falls within a range of 0 to 1.

17. A vehicle comprising a battery pack defined in claim 13.

* * * * *